United States Patent [19]
Stephenson

[11] Patent Number: 5,970,215
[45] Date of Patent: Oct. 19, 1999

[54] PRINTING VARIABLE DENSITY PIXELS ON A PHOTOSENSITIVE MEDIUM

[75] Inventor: Stanley W. Stephenson, Spencerport, N.Y.

[73] Assignee: Eastman Kodak Company, Rochester, N.Y.

[21] Appl. No.: 08/824,694

[22] Filed: Apr. 8, 1997

[51] Int. Cl.⁶ ............................. B41J 2/445; G06K 15/12; H04N 1/036; H04N 1/50

[52] U.S. Cl. .......................... 395/109; 395/111; 347/232; 347/251; 347/255; 358/302

[58] Field of Search ...................................... 395/111, 109; 347/115, 135, 232, 239, 240, 251, 255, 136; 358/501, 302

[56] References Cited

U.S. PATENT DOCUMENTS

| | | |
|---|---|---|
| 4,768,050 | 8/1988 | Beery . |
| 5,032,911 | 7/1991 | Takimoto . |
| 5,049,902 | 9/1991 | Duke . |
| 5,122,432 | 6/1992 | Hammann et al. . |
| 5,754,305 | 5/1998 | DeClerck et al. ...................... 347/135 |

*Primary Examiner*—Scott Rogers
*Attorney, Agent, or Firm*—Raymond L. Owens

[57] ABSTRACT

A printer for creating images on photosensitive sheets, receives digital images and uses a display to print the images onto a photosensitive medium. An optic projects image from the display onto photosensitive media. The printer converts the image data into separable binary planes of data sequentially transfers the separate binary planes to the display to create continuous tone images on the photosensitive media.

8 Claims, 4 Drawing Sheets

LO        DENSITY LEVELS        L255

PRINTING VARIABLE DENSITY PIXELS ON A PHOTOSENSITIVE MEDIUM

FIELD OF THE INVENTION

The present invention relates to apparatus for printing variable density pixels which form an image on photosensitive media wherein such images correspond to a received digital image.

BACKGROUND OF THE INVENTION

It is useful to transmit images from an electronic camera to a small, light portable printer. U.S. Pat. No. 5,032,911 discloses a cathode ray tube (CRT) that writes lines of data onto a photosensitive sheet as the sheet is advanced past the CRT. Such a printer requires accurate advancement of medium under a linear writing element. A cathode ray printer is large, heavy and power intensive. A color liquid crystal display (LCD) provides a smaller, more efficient light writer. A LCD also eliminates the need to accurately advance media to form an image on photosensitive media. LCDs built for real-time display of full color images generate over 100 color levels in less than 1/30 of a second. This display refresh speed requires costly analog circuitry to feed a continuous quality image to the display. Notwithstanding the effectiveness of these LCD printers, there is still a problem in providing low cost, high speed multidensity output prints.

SUMMARY OF THE INVENTION

It is an object of the present invention to provide a non-analog drive to a liquid crystal display to write onto photosensitive media to provide photographic quality hard copy.

This object is achieved by apparatus for printing variable density pixels which form an image on a photosensitive medium wherein such images correspond to a received digital image, comprising:

a) display means responsive to a received digital image for presenting such image on a display;

b) means for positioning the photosensitive media in image transfer relationship with the display means; and c) optical means for projecting an image from the display onto photosensitive media, including:

i) means for converting image data into separable binary planes of data; and ii) means for sequentially transferring each separate binary plane of image data to the display to create variable density pixels on the photosensitive media.

ADVANTAGES

This invention provides for a portable, small, low-cost printer for electronically stored images. The display is repeatedly loaded with binary values to each pixel to generate near-continuous tone. Data transfer rates are adjusted to match media sensitivity and eliminate the need for expensive analog circuitry and a high speed processors. A neutral density filter matches print speed to media sensitivity. Illumination intensity is adjusted to match media sensitivity. Lack of analog circuitry to drive the display saves cost, volume and power. Because the image is printed simultaneously, an accurate sheet index mechanism is not required.

DETAILED DESCRIPTION OF THE INVENTION

The present invention is directed to a compact portable printer used in conjunction with electronic cameras. Printers are known that receive data from various electronic capture devices. An electronic interface permits the images within the cameras to be transmitted to such a printer. One example is the Casio QV-xx series of electronic cameras that capture and store images internally. The QB-10 is a thermal printer that can be connected to the electronic camera to create photographic quality images.

The above Casio printer uses a thermal print head to print three colors sequentially onto a dye receiver. The above Casio cameras transmit an image to the printer as three eight bit binary color planes that represent the color intensity for each pixel of the image. A resistive element head in the printer is modulated to transfer the quantity of dye to a receiver that corresponds to the color intensity value transmitted by the camera. This process is repeated for each pixel of each of the three binary color planes until a durable, photographic quality color image is formed on the dye receiver.

The Casio printer requires large amounts of power to heat the pixels and drive the sheet. Consequently, this printer cannot contain it's own power and needs to be plugged into an external source of power. The printer is large and requires large, heavy and expensive electronics to convert line power to print. The unit also requires that the dye receiver sheet be precisely advanced under the printing head. The heating elements across the head must also be precisely controlled to prevent image artifacts.

Figure 1:
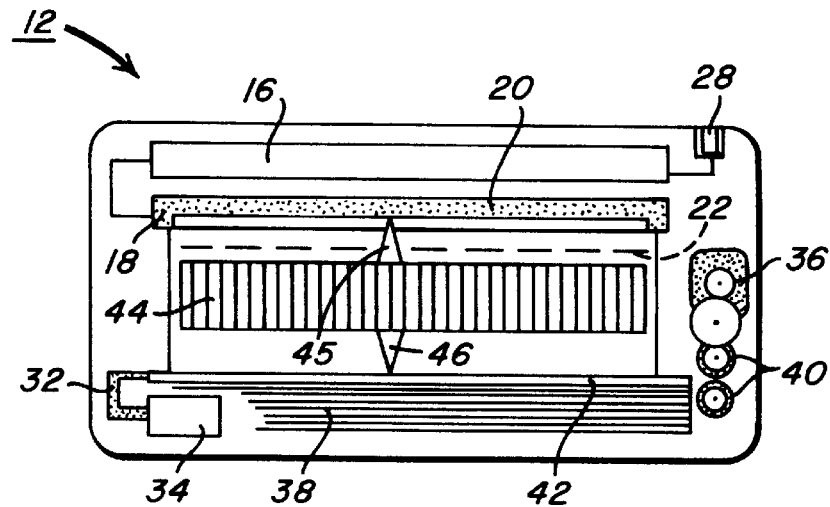
FIG. 1 is a top sectional view of an electronic printer in accordance with the present invention.

FIG. 1 shows a sectional view of electronic printer 12 that uses a display 18 as the image writer. Display 18 can be a liquid crystal display having a conventional structure. Liquid crystals are selectively rotated in an electric field to vary the polarization of a pixel. Rotation of the liquid crystals varies the density of each pixels when acting in conjunction with a second polarizing element incorporated into the display. It will be understood that each separate binary plane of image data is sequentially transferred to the display to create variable density pixels on the photosensitive media which are in the form of photosensitive sheet 42. The pixels can be covered with a color filter array to create color images. The display 18 also includes a source of illumination which illuminates the liquid crystal display with the intensity level of such light source being selected in accordance with the speed of the photosensitive sheet in the printer 12. Display 18 incorporates fluorescent white-light illuminator 20 behind the pixels. Alternatively, display 18 can support selectively energizable light emitting organic phosphors or an array of gas energizing electrodes within a glass envelope.

Again referring to FIG. 1, at the top of a media stack 38 is a photosensitive sheet 42, which is positioned with its photosensitive surface facing display 18. The photosensitive sheets are photosensitive and are loaded into the printer and stored in photosensitive manner as is known in the art. Photosensitive sheets can be found in current art as instant silver-halide sheets or pressure sensitive microencapsulated crushable color particles such as disclosed in U.S. Pat. Nos. 4,768,050, 5,049,902, and 5,122,432. Alternatively, images can be stored on photographic film and then stored and chemically processed at a later time. The microencapsulated media typically requires long exposure times to form images. Silver halide imaging systems have significantly greater sensitivity to light and print at faster rates.

Printing optic 44 focuses an image on display 18 onto the photosensitive surface of sheet 42. Printing optic 44 can be formed from Nippon Sheet Glass rod lens array type 20B which has a total conjugate 15.1 mm. The actual element is 6.89 mm tall and first working distance 45 and second working distance 46 are 4.10 mm. Alternatively, the printing optic can be formed of a series of plates supporting optical micro-surfaces. After exposure, photosensitive sheet 42 is urged by picker 32 into processing rollers 40. Processing rollers 40 are turned by process roller drive 26 to process the latent image formed on photosensitive sheet 42.

In the case of silver halide imaging, a pod of chemicals at the beginning of photosensitive sheet 42 is burst by processing rollers 40. The chemicals are spread across the image of photosensitive sheet 42 as photosensitive sheet 42 passes through processing rollers 40. The chemicals operate on the latent image to create a permanent colored dye image on photosensitive sheet 42. In the case of crushable media, the rollers apply pressure to micro-beads containing the latent image. Burst micro-beads release dye chemistries onto photosensitive sheet 42 to create a permanent color image.

Figure 2:
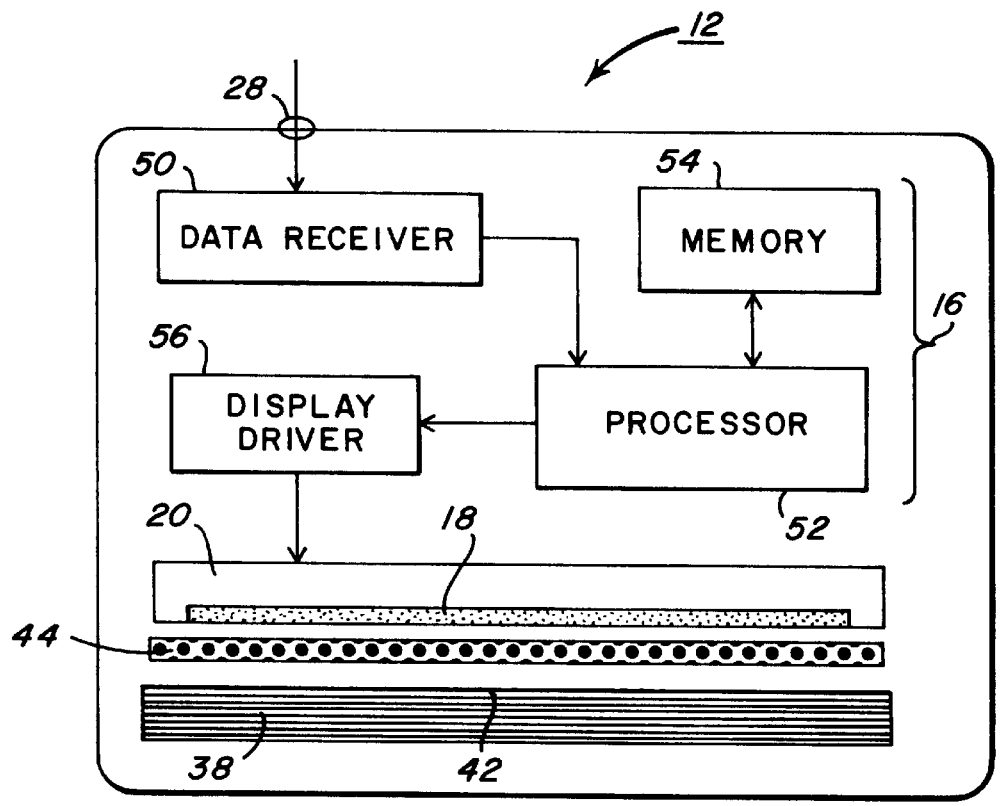
FIG. 2 is a block diagram which illustrates the transfer of digital information to produce a print.

A digital image from an electronic camera can be transmitted to printer 12 through printer link 28. The transfer of digital image which is received by the printer can be accomplished using conventional communications methods. Alternatively, printer link 28 can be an infra-red sensor that receives images in the form of modulated infrared light. FIG. 2 is a schematic of the image data path through printer 12. Data are received by data receiver 50, passed through a image processor 52, and are stored in image memory 54. After the digital image is received, the image data are transferred by the image processor 52 to a display driver 56 which drives display 18.

The display 18 is responsive to receive digital image from the processor 52 and, of course, presents such image on the image display 18. As shown in FIG. 2, the photosensitive sheet is positioned in relationship with display 18 to receive visual images. The printing optic 44 is shown in FIG. 1 and projects an image from the display onto the photosensitive sheet. As will become clearer from the subsequent discussion, the processor 52 converts the image data into separabe binary planes of data, and sequentially transfers each separate binary plane of image data to the display 18 to create variable density pixels on the photosensitive sheet.

Figure 3:
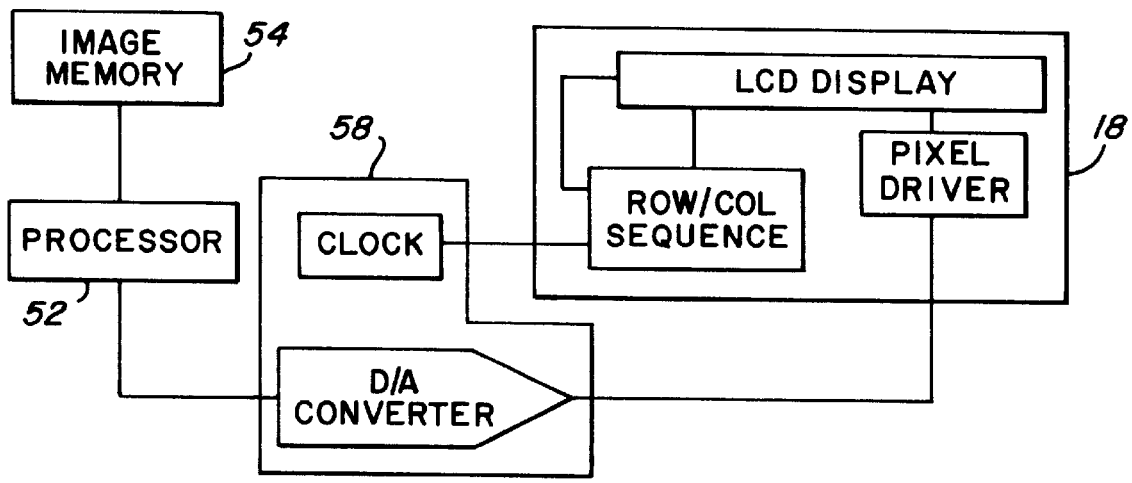
FIG. 3 is a prior art schematic circuit used to drive a high resolution liquid crystal display.

FIG. 3 is a schematic of prior art arrangement for driving the display 18. When the display is a liquid crystal device, it can be used to create photographic quality images at motion refresh rates. Such data rates require that data are converted to analog signals and transmitted to the display 18. Horizontal and vertical synchronization signals generated by a clock are used to control the flow of analog data to the liquid crystal display. An analog transmission time of approximately 33 milliseconds permits motion images to be displayed on the liquid crystal display. It also requires the processor to send the data within the refresh time.

The human eye requires at least 60 color levels within a 30 millsecond time period to sense an image to have photographic qualities. If the binary planes are loaded at a rate slower than 500 microseconds, the image will be non-visual. Additionally, LCDs have a response time of about 30 microseconds. The drive scheme according to the present invention uses the display at non-visual response rates so that the binary planes are sequentially transferred to form an image at below visually sensitive refresh rates.

Figure 4:
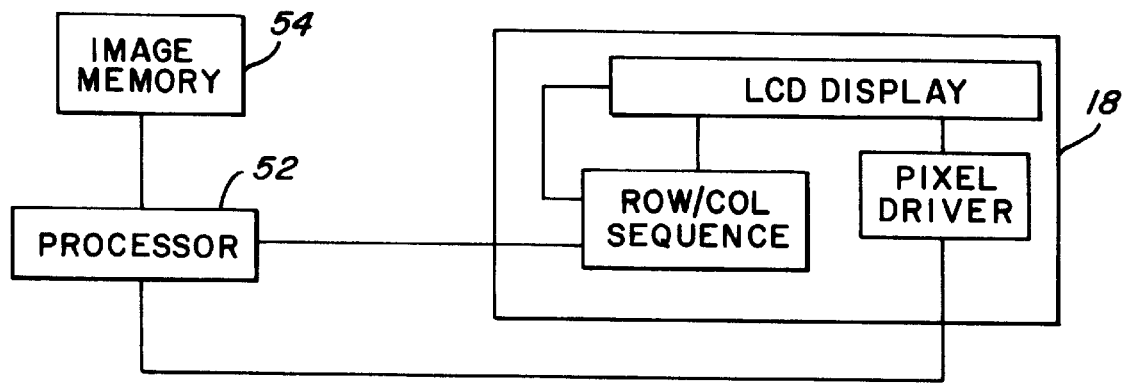
FIG. 4 is a schematic of the display drive for electronic printer of FIG. 1.

FIG. 4 is a schematic of a drive scheme in accordance with the present invention for use with printer 12. The print speed is slowed to well below analog refresh rates to eliminate analog signal conversion and video synchronization circuitry 58. Preferably, the image is written to display 18 as 256 separate binary planes of data at 33 milliseconds intervals to write 256 units of exposure in 8.45 seconds. In the case of silver halide media, a filter 22 is applied between the display 18 and the photosensitive sheet 42 to match fast media to the slow print time. More particularly, when the filter 22 is a neutral density filter, it will be arranged to reduce the intensity of light to match the speed or sensitivity of the photosensitive sheet. Alternatively, power to display illuminator 20 in the display 18 is significantly reduced to match fast media speed to slow print speed. Reducing the light output from the display illuminator 20 has the advantage of reducing energy demand on the printer.

The slow printing speed permits the processor to directly drive the display using binary data that either activate or deactivate individual pixels. Power and printer cost are significantly reduced by the elimination of circuitry required to convert the eight bit image data into 256 level analog signals and synchronize data transmission to a video signal. The slower printing rate permits the use of a less powerful and less expensive digital processor.

Figure 5:
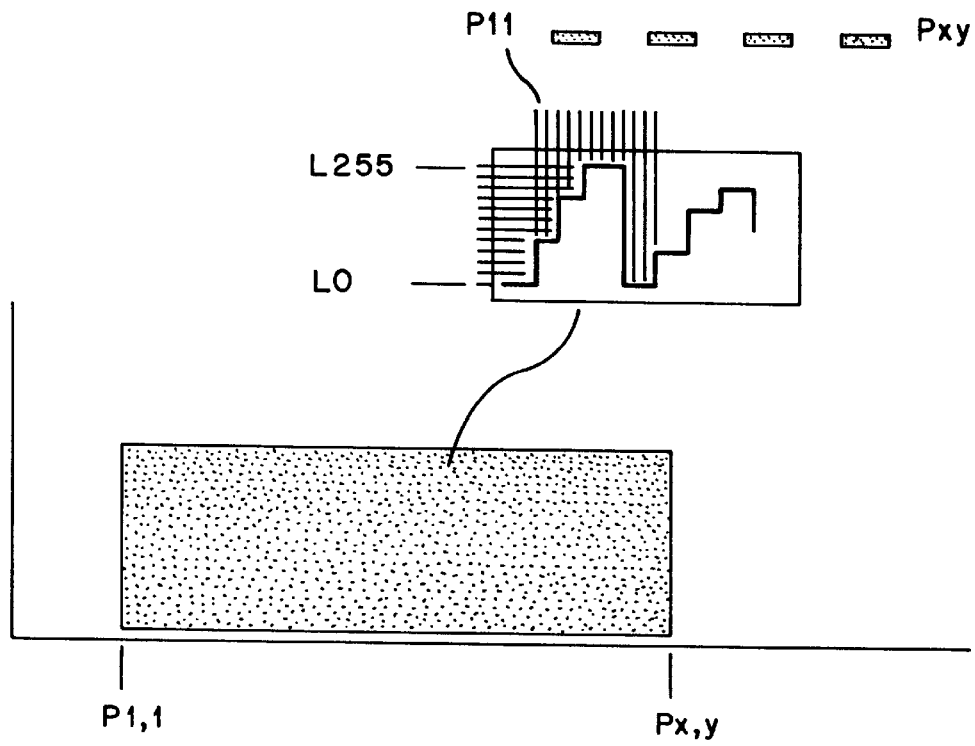
FIG. 5 is a prior art diagram of drive signals for a high color resolution liquid crystal display.

FIG. 5 shows prior art with data applied to the display as analog signals. Reference is made to a negative printing system, however, a positive system can be used by inverting the signal logic. The image data is written out to the display for a series of pixels from a first pixel P1,1 across an array of x horizontal and y vertical pixels ending in pixel address Px,y. Digital image data is converted to voltages corresponding to the density level of each pixel. The data are converted to three analog color signals (RGB) to drive the liquid crystal display. The red, green and blue signals are mutiplexed by circuitry that feeds the each signals to their respective red green and blue pixels in the display.

Zero voltage (L0) prevents light emission from the display, and all dye formation is inhibited. Each count of image value increases the voltage delivered to a pixel of the display. As the voltage increases, light output of the display decreases and dye formation increases. Conversion to an analog signal must be accurate to provide for regular and consistent gradation from minimum density to maximum density for each color plane. The image is written in one 33 milliseconds write cycle.

Figure 6:
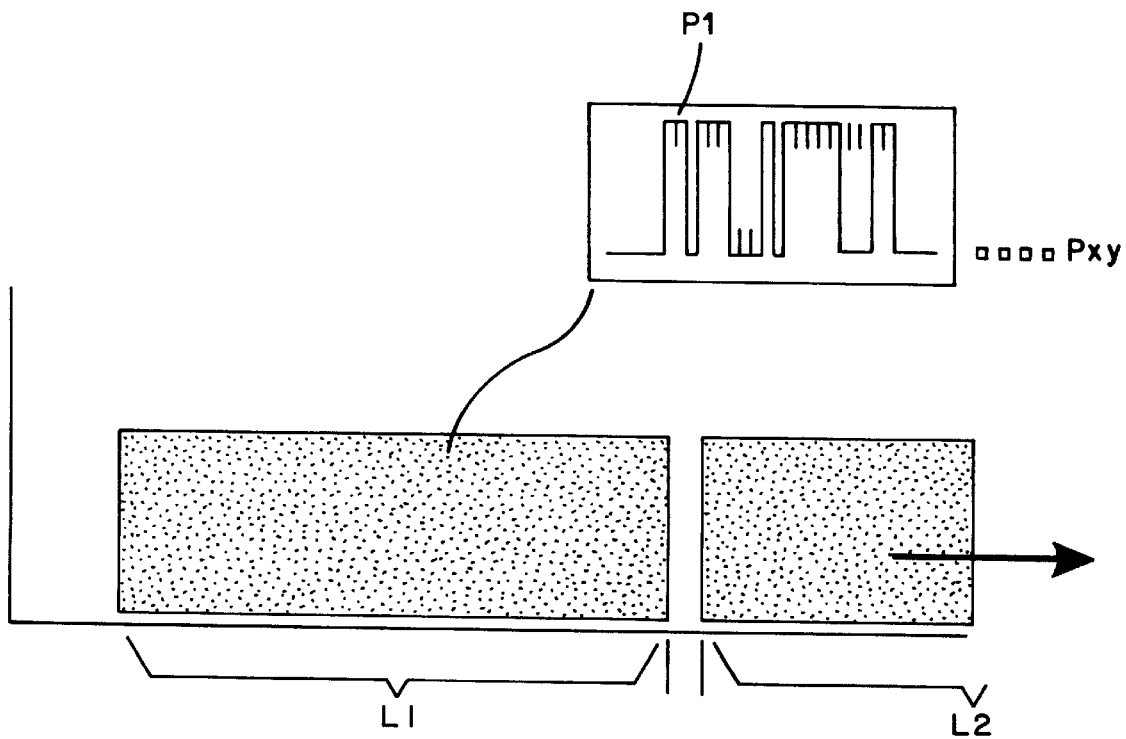
FIG. 6 is a diagram of the drive signals for a single print level of the electronic printer of FIG. 1.
Figure 7:
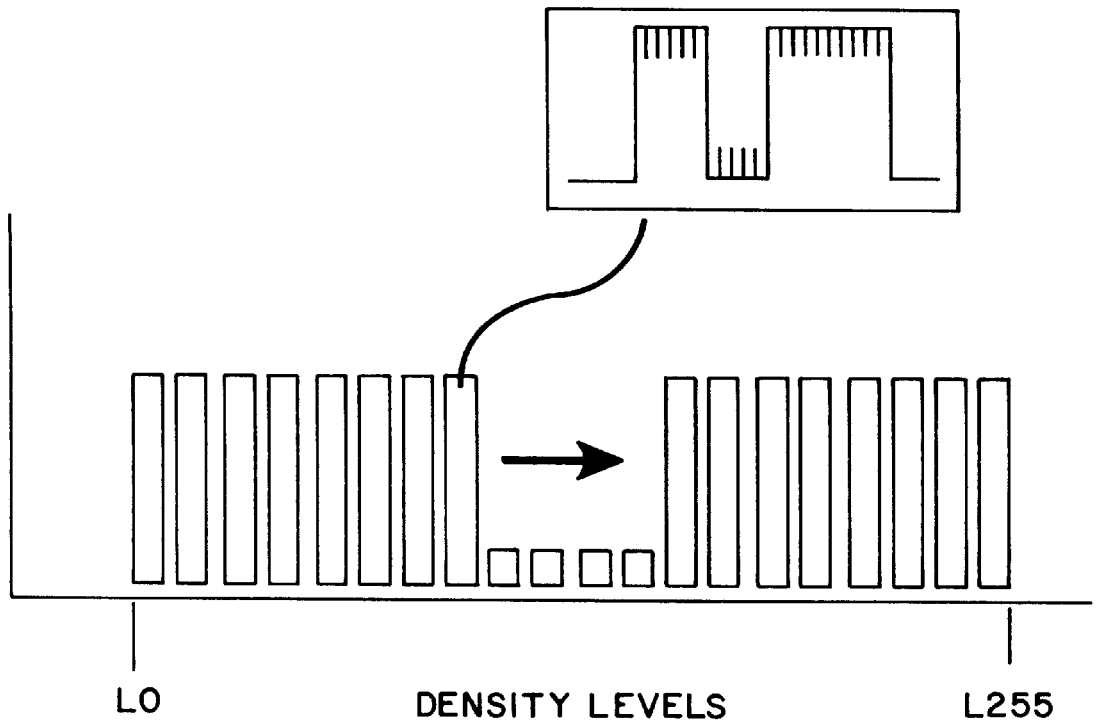
FIG. 7 is a diagram of the drive signals for a printing sequence of the electronic printer of FIG. 1.

FIG. 6 is a diagram of drive signals used in the improved printer. Each density level (L1) is written to the display during the 33 millisecond write cycle but only as binary values. The processor synchronizes transmission of the bits to the LCD by directly controlling the horizontal and vertical synchronization signals. Each pixel is given an "on" or "off"

signal within the write cycle L1. FIG. 7 is a trace of all 256 of the write cycles. Areas requiring long exposures will be receive an "on" signal in each of the 256 write cycles. Areas that are unexposed will receive an "off" signal for all of the write cycles. Controlling the number of write cycles that a pixel is on permits for control of density in steps equal to the number of write cycles. If more than 25 levels are used, continuous tone images are written by display 18 onto photosensitive sheet 42. This technique permits continuous tone images to be written without the need for analog signal conversion. If the media response is non-linear, then it will be advantageous to vary the write time cycles.

This scheme provides a significant cost reduction. The invention provides for a small, light, inexpensive printer with self-contained power supply that provides images within 10 seconds. The display refresh rate and number of levels can be adjusted to accommodate print times for a variety of media. Printing optics 44 projects an image from the display 18 onto a photosensitive sheet 42 located at an image transfer position. The optics, of course, convert the image data into separable binary planes of data. Each plane is recorded at one time by sequentially transferring each separate binary plane to the display to create variable density pixels on the photosensitive sheet. Printer electronics 16 can sense the sensitivity of media sheets 38 and adjust loading times correspondingly.

Figure 8:
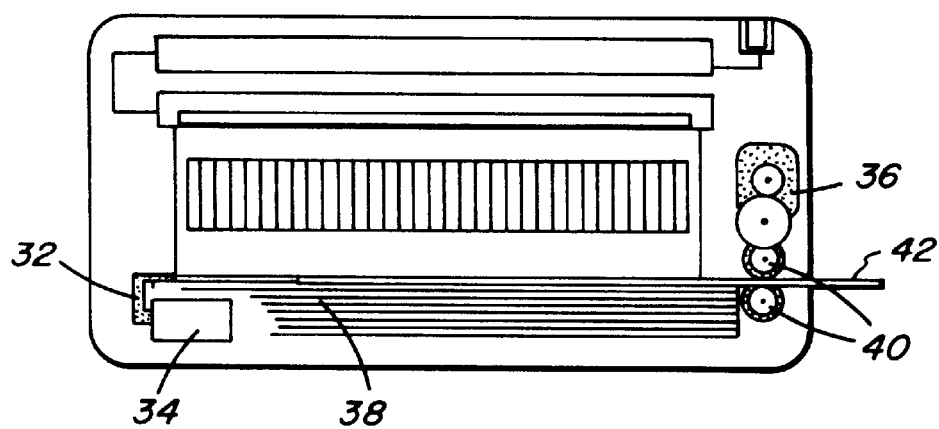
FIG. 8 depicts the printer of FIG. 1 as a printed sheet is being ejected from the printer.

FIG. 8 shows the system after exposure of photosensitive sheet 42. Display 18 has been turned off by printer electronics 16. Picker 32 moves under the actuation of picker drive 34 to move photosensitive sheet 42 into rotating urge rollers 40. Processing rollers 40 grip and drive photosensitive sheet 42 out of printer 12, providing the operator with a color record of the digital image.

The invention has been described in detail with particular reference to certain preferred embodiments thereof, but it will be understood that variations and modifications can be effected within the spirit and scope of the invention.

PARTS LIST 12 printer
16 printer electronics
18 display
20 display illuminator
22 filter
32 picker
34 picker drive
36 roller drive
38 media sheets
40 processing rollers
42 photosensitive sheet
44 printing optic
45 first working distance
50 data receiver
52 image processor
54 image memory
56 display driver
58 synchronization circuitry

What is claimed is:

1. Apparatus for printing variable density pixels which form an image on a photosensitive medium wherein such images correspond to a received digital image, comprising:
   a) a display responsive to a received digital image for presenting such image on the display;
   b) means for positioning the photosensitive media in image transfer relationship with the display means; and
   c) means for projecting an image from the display onto photosensitive media, including:
      i) means for converting image data into separable binary planes of data; and
      ii) means for sequentially transferring each separate binary plane of image data to the display to create variable density pixels on the photosensitive media.

2. The apparatus of claim 1 wherein said display includes a liquid crystal display.

3. The apparatus of claim 2 further including a color filter array disposed over the liquid crystal display.

4. The apparatus of claim 3 wherein the liquid crystal display includes a light source which illuminates the liquid crystal display with the intensity level of such light source being selected in accordance with the speed of the photosensitive media.

5. The apparatus of claim 1 further including a neutral density filter arranged to reduce the intensity of light to match the speed or sensitivity of the photosensitive media.

6. The apparatus of claim 4 further including a neutral density filter arranged to reduce the intensity of light to match the speed or sensitvity of the photosensitive media.

7. The apparatus of claim 1 wherein said binary planes are sequentially transferred to form an image at below visually sensitive refresh rates.

8. The apparatus of claim 1 wherein the binary planes are loaded at a rate slower than 500 microseconds.

\* \* \* \* \*